Oct. 16, 1956 D. L. HOBART 2,766,997
BALANCED CONDUIT EXPANSION JOINT
Filed Jan. 21, 1953 3 Sheets-Sheet 2
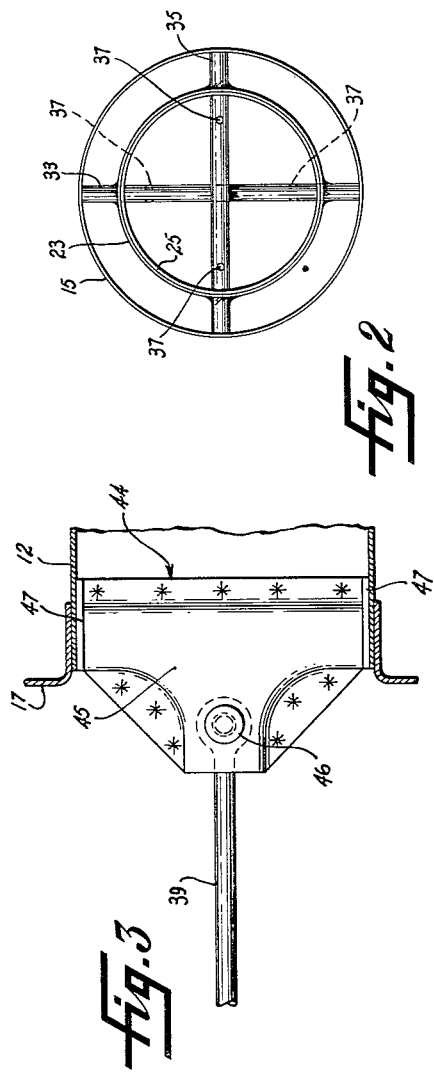
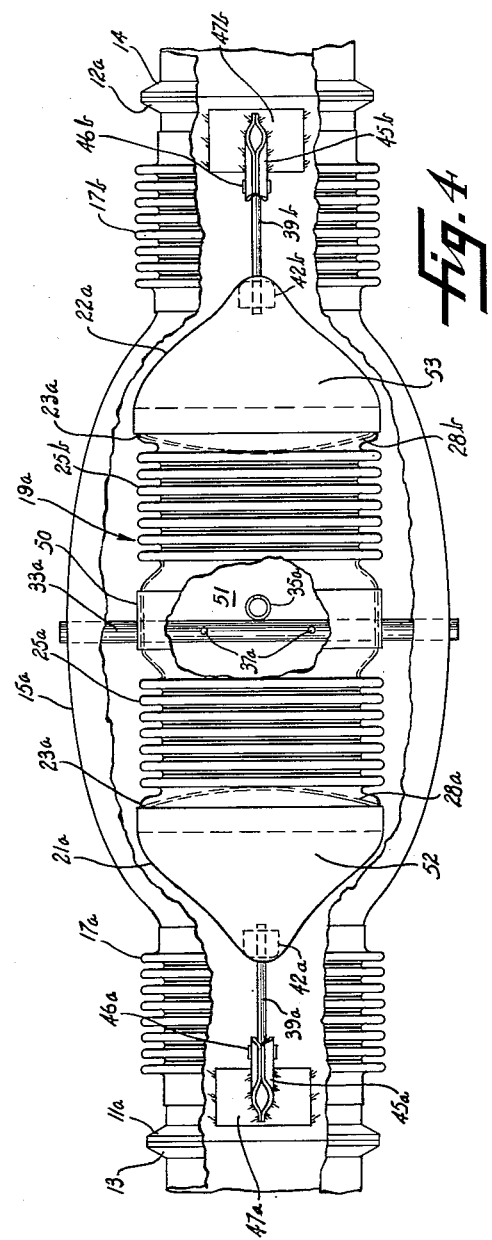
INVENTOR:
Donald L. Hobart
BY
ATTORNEY Oct. 16, 1956  D. L. HOBART  2,766,997
BALANCED CONDUIT EXPANSION JOINT
Filed Jan. 21, 1953  3 Sheets-Sheet 3

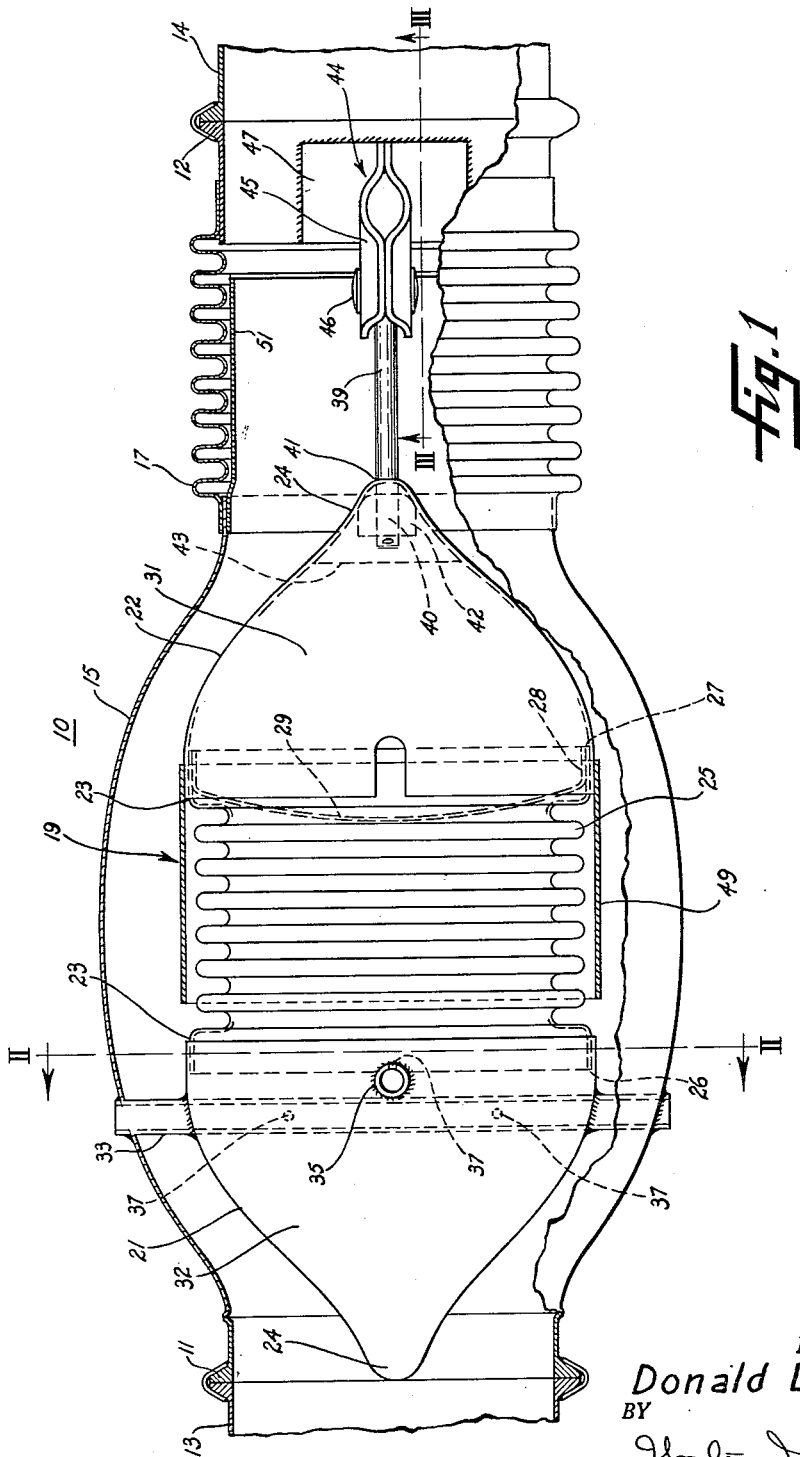

INVENTOR:
Donald L. Hobart
BY
ATTORNEY

United States Patent Office 2,766,997
Patented Oct. 16, 1956

2,766,997

BALANCED CONDUIT EXPANSION JOINT

Donald L. Hobart, San Diego, Calif., assignor, by mesne assignments, to General Dynamics Corporation, a corporation of Delaware Application January 21, 1953, Serial No. 332,267

10 Claims. (Cl. 285—228)

This invention relates to an expansion joint, and more particularly to an expansion joint adapted to substantially balance or equalize pressure forces acting within a conduit, pipe, or duct subjected to varying pressures and temperatures, while preserving the capability of the expansion joint to accommodate changes in length or changes in axial alignment of such a conduit, pipe, or duct due to expansion, contraction, or other causes.

In order to provide for expansion and contraction in a conduit, it has been conventional practice to provide expansible and collapsible joint means, such as corrugated bellows, as an integral part of the conduit. However, such a bellows is affected not only by thermal expansion and contraction of the conduit, but also by the pressure differential between the inside and outside of the conduit. This pressure differential, if not equalized in some manner, tends to elongate the bellows when the internal pressure is greater than the external pressure and, conversely, tends to collapse the bellows when the external pressure is greater than the internal pressure. Thus, it will be apparent that in a wholly satisfactory expansion joint the pressure differential should be neutralized in a manner that will substantially eliminate its effect upon the bellows.

Further, elongation or contraction of the bellows due to pressure differential must be prevented for another reason. It will be evident, for example, that elongation of the bellows necessarily implies movement of the adjacent conduit sections, and movement thereof is detrimental for many reasons, but primarily for the reason that such movement produces undesirable bending moments in elbow joints of the conduit system, or produces undesirable high loads in external conduit supporting structure.

Also, sudden increase or decrease in the pressure differential, or vibration, or shock loads often cause relative axial displacement of the conduit sections adjacent to an expansion joint, and a satisfactory expansion joint must to some degree permit such displacement in order to prevent unduly high stresses in the duct walls.

In aircraft ducting systems it is further necessary that a satisfactory expansion joint be light in weight, occupy little space, and embody a minimum of external braces, flanges, or similar obstructions which may become entangled or interfere with other apparatus in the aircraft.

It is therefore, one of the principal objects of this invention to provide an improved expansion joint so constructed as to permit relative movement of conduit sections adjacent the joint laterally, axially, and angularly.

It is another object of the invention to provide an expansion joint of improved construction adapted to substantially balance or equalize pressure forces acting within a conduit containing a fluid under pressure.

It is a further object of the invention to provide an improved expansion joint that occupies a minimum of space and is light in weight.

It is yet another object of the invention to provide an expansion joint of improved form which is simple and economical and requires a minimum of external anchorages, or external reinforcing means to prevent undesirable movement of conduit sections adjacent thereto.

Other objects and features of the present invention will be readily apparent to those skilled in the art from the following specification and appended drawings wherein is illustrated a preferred form of the invention, and in which:

Figure 1 is a longitudinal elevational view of a preferred embodiment of the invention shown partly in section;

Figure 2 is a sectional view taken along line II—II of Figure 1.

Figure 3 is a detail view taken along line III—III of Figure 1.

Figure 4 is a longitudinal elevational view of a second embodiment of the invention, portions being cut away for clarity.

Figure 5:
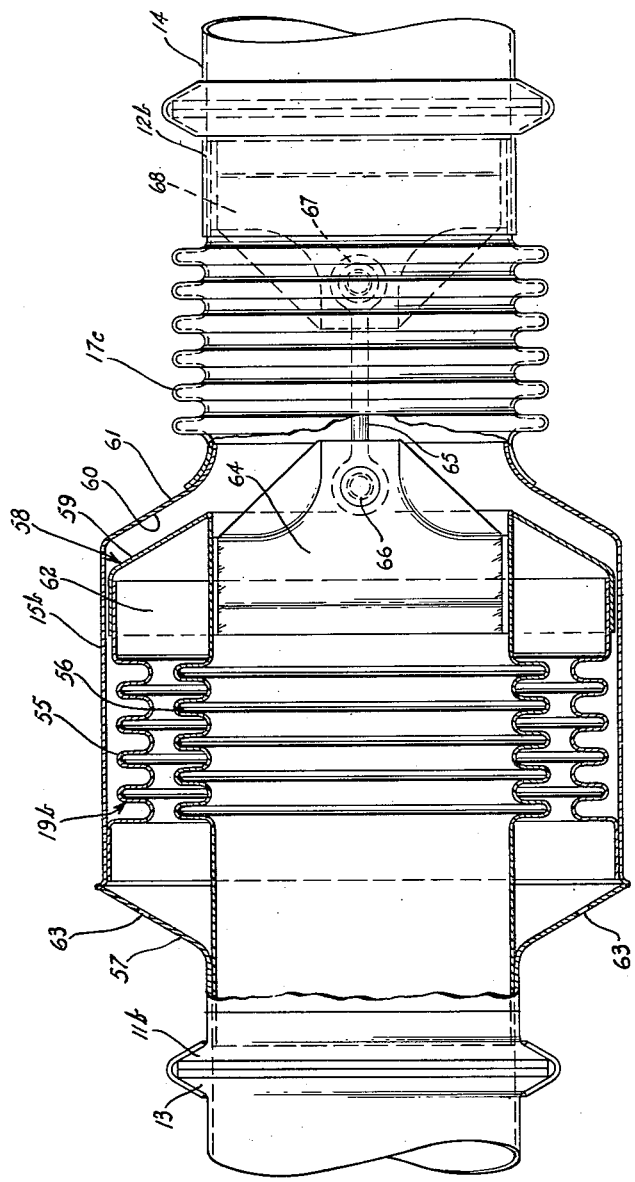
Figure 5 is a longitudinal elevational view of a third embodiment of the invention shown partly in section.

Reference now will had, in detail, to the drawings, and, in particular, to Figure 1, wherein an embodiment of the expansion joint of the present invention is shown, indicated generally by the numeral 10. Expansion joint 10, as illustrated, comprises rigid, longitudinally aligned after and forward end members or flanges 11 and 12, respectively, adapted to connection, respectively, with adjacent conduit sections 13 and 14, which are substantially in longitudinal alignment. An outer casing 15, which is essentially an open ended hollow member of circular cross sectional area, gradually varying from a maximum area center section to a minimum area at the ends thereof, is located between flanges 11 and 12, one open end of the casing being secured to after flange 11 and the other open end being connected to forward flange 12 by an expansible and collapsible tubular outer bellows 17 formed of thin metal and being circumferentially corrugated. It is noted that flanges 11 and 12, casing 15 and bellows 17 effect a flexible fluid coupling means for the conduit sections 13 and 14. They afford an integral structure which, by virtue of the flexible nature of bellows 17, is capable of accommodating such changes in the length of a conduit being serviced as may occur due to temperature variation or other causes.

If it is desired to permanently connect the expansion joint 10 between conduit sections 13 and 14, as by welding, extensions of outer casing 15 can be provided, in substitution for flanges 11 and 12, the extensions being adapted for permanent connection to conduit sections 13 and 14.

The main portion of a pressure balancing mechanism generally designated by the numeral 19 is surrounded and enclosed by casing 15, and, desirably, includes after and forward pressure caps 21 and 22, respectively. Each of the caps 21 and 22 is essentially a thin-walled hollow shell of circular cross-section with one end 23 open, the cross-sectional area of the cap gradually diminishing from open end 23 to a rounded tip 24, forming a more or less streamline shape.

Flexible fluid coupling means, such as an expansible and collapsible circumferentially corrugated tubular inner bellows 25, is interposed between caps 21 and 22 and projects its opposite open ends 26 and 27 within open ends 23 of the caps for connection, as by welding, to the inner wall surfaces of these caps. A generally cup-shape plug element 28 is fitted into open end 27 of bellows 25 and is welded in place. Base 29 of plug element 28 forms a wall across open end 23 of forward cap 22, thereby sealing with respect to each other a chamber 31 within forward cap 22 and a chamber 32 within, and common to, bellows 25 and after cap 21. Streamlined caps 21 and 22 are employed when a minimum resistance to fluid flow is desired. Although use of such caps is preferred, they may be omitted if the pressure drop in a particular conduit system is not critical. In such case, a second plug element 28 would be utilized and would be fitted into open end 26 of bellows 25 so that both ends of the bellows would be closed and the struts 33 and 35 would be so arranged as to accommodate the second plug 28 and vent into internal bellows 25.

As seen in Figure 2, after cap 21 is rigidly fixed in a position wherein its longitudinal axis is common with that of casing 15 by means of a tubular strut 33 and a tubular strut 35, which struts are positioned at right angles to one another. Each of the struts 33 and 35 passes completely through after cap 21, and each projects its opposite ends through openings provided in the walls of casing 15 to communicate with the atmosphere. Both struts 33 and 35 are suitably secured in fluid tight connection with the casing 15 at their projection through the openings therein and at the areas where they emerge from the walls of after cap 21. In each of the struts 33 and 35 at the portions thereof contained in after cap 21 there are provided a plurality of holes 37 through which chamber 32 of after cap 23 is vented into the hollow interior of tubular struts 33 and 35, with the result that chamber 32 is subject to atmospheric pressure.

A tension member, such as tie rod 39, projects its threaded end 40 through an opening 41 provided in the rounded tip 24 of forward cap 22, which threaded end 40 is held within cap 22 by a nut 42, larger in size than opening 41, threaded onto end 40 and cotter-keyed in place. Rounded tip 24 of cap 22 is reinforced for greater strength by a smaller inner cap 43 of configuration similar to rounded end 24, and having an opening for passage of threaded end 40. Rod 39 extends from its connection at cap 22 axially of tubular outer bellows 17 to a support means 44 at flange 12. Support means 44 comprises a transverse strut 45 to which the forward end of rod 39 is pivotally connected at a pin joint 46, the connection being a loose one to permit limited movement of rod 39 up and down upon pin joint 46. Strut 45 is of a configuration as best shown in Figures 1 and 3 and is secured to opposed plate elements 47 which are contoured to fit flush against the interior walls of flange 12 and are affixed to such walls by welding.

Opening 41 in tip 24 of forward cap 22 through which threaded end 40 of the rod 39 passes into chamber 31 of forward cap 22 is necessarily larger in size than the diameter of the end 40 so that leakage from the conduit into chamber 31 will occur. However plug element 28 seals chamber 31 and its contents from chamber 32 which is subject to atmospheric pressure and permits the unit as a whole to function in the manner required.

Casing 15 and caps 21 and 22 preferably are so shaped that the surfaces thereof in contact with fluid flowing through the expansion joint provide relatively slight obstruction to the fluid. However, to promote an even smoother flow of fluid, and improve pressure drop characteristics of the invention a circumferentially disposed sleeve 49 is attached, as by welding, to the large end of forward cap 22 and extended, in the direction of after cap 21, over inner bellows 25 in overlying or surrounding relation thereto. A second sleeve 51 is attached, as by welding, to the interior wall of casing 15 at its right hand end, as viewed in Figure 1, and extended in the direction of flange 12 internally within bellows 17 in underlying relation to the interior walls thereof. Both sleeves 49 and 51 are positioned spaced from their respective associated bellows 25 and 17 to allow sufficient clearance for the desired extending and collapsing movements of these bellows.

In order that the differential pressure in expansion joint 10 be effectively balanced, it will be readily apparent that the effective area of the right hand end of bellows 25, as viewed in Figure 1, must be substantially equal to the effective area of bellows 17, and likewise, the effective area of the left hand end of bellows 25 must be substantially equal to the effective area of conduit section 13 at flange 11. With this arrangement, the effect of the difference in pressure between the inside and the outside of the conduit which tends to separate conduit sections 13 and 14 adjacent the expansion joint 10 is balanced or equalized because the same pressure differential acts upon the effective areas of bellows 25 to tend to draw the adjacent conduit sections together.

More specifically, the operation of the expansion joint 10 is as follows. The pressure differential acting over the effective area of the conduit section 14 to the right of casing 15, as viewed in Figure 1, may be considered to be a first force, and the same pressure differential acting over the effective area of the conduit section 13 to the left of casing 15 may be considered to be a second force, these forces acting in opposite directions and tending to separate the conduit sections 13 and 14 from the expansion joint 10. For clarity of explanation, it will be assumed that the first force acts upon end flange 12, tending to move it to the right. This first force is effectively counterbalanced by an equal and opposing force produced by the action of the pressure differential against the effective area of the right hand end of bellows 25 and transmitted through tie rod 39 back to end flange 12, tending to move flange 12 to the left.

Similarly, the second force, which is assumed to be acting upon end flange 11 and tending to move it to the left, is effectively counterbalanced by an equal and opposing force produced by the action of the pressure differential against the effective area of the left hand end of bellows 25 and transmitted through struts 33 and 35 and casing 15 back to end flange 11, tending to move flange 11 to the right.

It will be apparent that though the separating effect of a pressure differential is neutralized that this is accomplished without affecting the ability of joint 10 to accommodate changes in length of the conduit sections 13 and 14, secured to opposite ends of expansion joint 10, since expansion and collapse movements of bellows 17 and 25 are not hindered. In addition, it will also be noted that relative lateral and angular displacement of these conduit sections 13 and 14 is likewise permitted by reason of the inherent flexibility of the two bellows and the pivotal connection of tie rod 39 to pin joint 46.

In the embodiment of the present invention, above described, the use of but two bellows in the expansion joint is particularly desirable in that the fewer the number of bellows, the smaller is the force required to effect compression or elongation of the complete expansion joint. Thus, the joint is more sensitive and more readily responsive to changes in length of the conduit in which the joint is incorporated. This sensitive response enables the use of thinner, and therefore more lightweight, conduits, by virtue of the fact that stresses set up by forces due to changes in length are primarily absorbed by the sensitive flexing of the bellows, and thus need not be absorbed by the conduits.

In Figure 4 a second embodiment of the present invention is illustrated. In this embodiment and in a third embodiment described hereinafter, where parts are substantially similar to parts of the first embodiment, such similarity is indicated by a similar numeral having an appropriate subscript.

As is apparent, this embodiment is like the preferred embodiment in that it includes an integral pressure balancing mechanism, generally designated 19a, enclosed within a casing 15a located between two end flanges 11a and 12a. However, in this second embodiment two outer expansible and collapsible tubular bellows 17a and 17b are employed, with bellows 17a interconnecting casing 15a and flange 11a and bellows 17b affording interconnections between casing 15a and flange 12a.

Pressure balancing mechanism 19a is comprised of two pressure caps 21a and 22a, similar to caps 21 and 22 of the first joint, which are connected at their open ends 23 respectively to inner bellows 25a and 25b. In turn, bellows 25a and 25b are joined by and connected to a supporting ring 50 having a diameter substantially that of the bellows 25a and 25b. Caps 21a and 22a, bellows 25a and 25b, and ring 50 effect an integral structure defining a central chamber 51 which is sealed from chambers 52 and 53 in caps 21a and 22a by a pair of plug elements 28a and 28b, plug elements 28a and 28b being affixed, as by welding, at the open ends 23a of caps 21a and 22a, respectively. Plug elements 28a and 28b are of like construction as plug element 28 of the first embodiment and serve the same purpose of confining leaking within the caps.

Pressure mechanism 19a is centrally maintained within casing 15a by tubular struts 33a and 35a positioned at right angles to each other but in this second embodiment passing completely through supporting ring 50 and emerging from openings provided in the walls of ring 50 and extending from ring 50 to pass through openings provided in casing 15a to open to the atmosphere. Struts 33a and 35a are secured in fluid tight connection with the casing 15 and ring 50, as by welds, in the areas of the openings which accommodate these struts. A plurality of apertures 37a in struts 33a and 35a afford passages from chamber 51 to the atmosphere by way of the hollow interior of the struts 33a and 35a, with the result that chamber 51 is subject to atmospheric pressure.

Whereas in the first described embodiment only the forward cap 22 was connected by a tension member to the end flange adjacent thereto, in this second embodiment both caps 21a and 22a are connected to an associated end flange. Thus cap 21a has one end of a tie rod 39a affixed to it by a nut 42a, which tie rod extends to a pivotal connection with a strut 45a at a pin joint 46a, the strut 45a being rigidly affixed by plates 47a to the interior walls of flange 11a. This arrangement is duplicated at the opposite end of the joint wherein a tie rod 39b is joined at its threaded end to cap 22a by a nut 42b, and extends to strut 45b for pivotal connection thereto by a pin joint 46b, strut 45b also having a rigid mounting to flange 12a through plates 47b which are welded to the interior walls of flange 12a. Thus caps 21a and 22a are interconnected respectively to their associated end flanges 11a and 12a in the same manner as forward cap 22 of the first embodiment is connected to its end flange 12.

The effective area of bellows 25a is substantially equal to the effective area of bellows 17a, and likewise the effective area of bellows 25b is substantially equal to the effective area of bellows 17b. Thus, a pressure differential tending to separate conduit sections associated with the expansion joint is balanced or equalized since the same pressure differential acting upon the effective areas of bellows 25a and 25b tends to draw the conduit sections together through the agency of tie rods 39a and 39b anchored within caps 21a and 22a, respectively, which apply an inward pulling force upon flanges 11a and 12a through the strut and plate connections previously described. As in the first embodiment, the balancing of the pressure differential forces is accomplished at no sacrifice to the capability of the expansion joint to accommodate changes in length of the adjacent conduit sections since the various bellows 17a, 17b, 25a and 25b are permitted to operate in the desired manner. In addition, it is apparent that relative angular displacement of the conduit sections is permitted since the various bellows are flexible and by reason of the pivotal interconnection of the caps 21a and 22a and the pin joints 46a and 46b.

Referring now to Figure 5, a third embodiment of the present invention is illustrated having certain features in common with the preferred embodiment previously described. This embodiment includes a casing 15b located between end flanges 11b and 12b, with one end of the casing being secured directly to end flange 11b, and the other end being connected to flange 12b through a tubular bellows 17c. As in the case of the two above described embodiments, the integral structure formed by the casing, bellows, and flanges is, by virtue of the flexing action of the bellows, capable of accommodating changes in the length of the conduit sections which may be connected to the end flanges 11b and 12b.

A pressure balancing mechanism 19b, comprising an expansible and collapsible tubular bellows 55 and a similar but smaller bellows 56, is positioned within casing 15b, the two bellows being concentric to each other and with their left hand ends as seen in Figure 5, secured, as by welding, to the casing 15b adjacent left hand end wall 57 and their opposite ends affixed by welding to an annular member 58 which is disposed within casing 15b and has an inclined wall or pressure face 59 which lies spaced from the inner face 60 of right hand end wall 61 of casing 15b. Pressure face 59 carried by annular member 58 is movable with, and does not hinder movement of, annular member 58. Thus, there is defined between the interior walls of bellows 55 and the exterior walls of bellows 56 a chamber 62 having one end closed by wall 59 of annular member 58 and the opposite end closed by wall 57 of casing 15b, which chamber 62 is subject to atmospheric pressure through a hole 63 provided in wall 57 of casing 15b. A transversely disposed strut 64, rigidly secured by welding to opposed walls of smaller bellows 56 at its right hand end, has connected to it one end of a tie rod 65 by a pin joint 66 which permits both vertical and horizontal pivotal movement of the tie rod 65. The opposite end of the rod 65 is secured by a pin joint 67 to a strut 68 which is suitably rigidly mounted to the interior wall of flange 12b.

Bellows 55 and 56 are of such proportions that the difference between the effective area of bellows 55 and that of bellows 56 is substantially equal to the effective area of the bellows 56. Likewise, in this embodiment, the effective area of inside face 60 of casing 15b is made substantially equal to this same difference. With this arrangement it will be evident that the effect of the pressure differential tending to separate the conduit sections being accommodated by this joint will be balanced or equalized by the force of the same pressure differential acting upon the effective area included between bellows 55 and 56 and the effective area of casing wall face 60, which latter force tends to draw the adjacent conduit sections together. Thus, the pressure differential force tending to pull flange 12b to the right, as viewed in Figure 5, is balanced by the pressure differential force acting upon the effective area included between bellows 55 and 56 which is transmitted through strut 64 and tie rod 65 to flange 12b and tends to pull flange 12b to the left. Likewise, the pressure differential force tending to pull flange 11b to the left is balanced by the pressure differential acting upon the effective area of casing inside face 60 which is transmitted through the walls of casing 15b to flange 11b and tends to pull flange 11b to the right.

As before, in addition to the ability of the expansion joint to balance the pressure differential forces, the joint is capable of accommodating changes in length of the adjacent conduit sections by virtue of the expansion and contraction of the various bellows 17c, 55 and 56. In addition, it is apparent that a limited relative angular displacement of the conduit sections is permitted by the ability of the bellows to flex and the pivotal connection of the pressure balancing mechanism 19b to pin joints 66 and 67. A particular advantage of this last embodiment is a reduction in pressure drop through the expansion joint, due to the reduction in the number of components of the pressure balancing mechanism that are in the direct path of the flowing fluid, as contrasted with the other embodiments previously discussed.

It should again be noted that the various embodiments of the present invention which have been described all embody an internal pressure balancing mechanism which greatly reduces the number of external fittings and attachments. Outwardly, the expansion joint resembles a somewhat oversize section of the conduit. In addition, it is believed that the use of a tension member, such as the tie rods 39, 39a, 39b and 65, within the expansion joint permits a very desirable reduction in the number of components within a joint. Inasmuch as the tension member is substantially aligned with the longitudinal axis of the joint and of the pressure balancing assembly, no eccentricity is created in maintaining a balance with the pressure differential, since the action of the tension member is directed substantially along the longitudinal axis of the pressure balancing mechanism, as is evident from the drawings and the description hereinabove made.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. An expansion joint for connection between adjacent ends of a pair of longitudinally aligned conduits adapted to contain fluid under pressure, said joint comprising a double ended hollow outer casing flexibly connected between the ends of the conduits, said casing being provided with a transversely disposed inner face, inner and outer flexible members concentrically positioned within and secured at one end to said outer casing and having an expansion chamber defined between them, said chamber having communication to the atmosphere whereby the chamber is subject to atmospheric pressure, and means secured to and coupling said inner and outer flexible members to a conduit end whereby the effect of fluid pressure acting on said inner and outer flexible members and said inner face of said outer casing is transferred to the conduits and opposes the effect of fluid pressure in the conduits tending to separate the ends thereof, simultaneously permitting longitudinal expansion and contraction of the conduits.

2. An expansion joint for connection between adjacent ends of a pair of longitudinally aligned conduits adapted to contain fluid under pressure, said joint comprising a double ended hollow outer casing between the ends of the conduits, said casing being provided with a transversely disposed inner face, flexible fluid coupling means and a rigid end member for connecting one end of said outer casing to an end of one conduit, rigid fluid coupling means for connecting the other end of said outer casing to an end of the other conduit, inner and outer flexible members concentrically positioned within and secured at one end to said outer casing and having an expansion chamber defined between them, said chamber having communication to the atmosphere whereby the chamber is subject to atmospheric pressure, and means secured to and coupling said inner and outer flexible members to said rigid end member whereby the effect of fluid pressure acting on said inner and outer flexible members and said inner face of said outer casing is transferred to the conduits and opposes the effect of fluid pressure in the conduits tending to separate the ends thereof, simultaneously permitting longitudinal expansion and contraction of the conduits.

3. An expansion joint for connection between adjacent ends of a pair of longitudinally aligned conduits adapted to contain fluid under pressure, said joint comprising a double ended hollow outer casing between the ends of the conduits, said casing being provided with a transversely disposed inner face, flexible fluid coupling means and a rigid end member for connecting one end of said outer casing to an end of one conduit, right fluid coupling means for connecting the other end of said outer casing to an end of the other conduit, inner and outer flexible members concentrically positioned within and secured at one end to said outer casing with a space between opposed walls of said members, said outer casing closing the space between said members at said end, a wall disposed across the other end of said members to close the space at this other end to define an expansion chamber between said inner and outer flexible members, said chamber having communication to the atmosphere whereby the chamber is subject to atmospheric pressure, and means secured to and coupling said inner and outer flexible members to said rigid end member whereby the effect of fluid pressure acting on said inner and outer flexible members and said inner face of said outer casing is transferred to the conduits and opposes the effect of fluid pressure in the conduits tending to separate the ends thereof, simultaneously permitting longitudinal expansion and contraction of the conduits.

4. An expansion joint for interconnecting ends of a pair of conduits adapted to carry fluid under pressure, said joint comprising a pair of end members, an outer casing connected between said end members and larger in cross section at its mid-portion than either of said end members, a flexible expansion means forming the connection between said outer casing and one of said end members, a longitudinally expansible substantially streamlined inner casing substantially concentrically positioned within said outer casing and forming a closed chamber therein, a hollow support member rigidly supporting a portion of said inner casing within said outer casing and defining a vent passage between said chamber and the atmosphere, said inner casing including a pair of streamlined end portions and a flexible expansion means forming a connection between said rigidly supported portion of said inner casing and one of said end portions, and flexible tension means disposed within said outer casing and connecting said one of said streamlined end portions of said inner casing to said one of said rigid end members which is connected to the first-mentioned flexible expansion means, said flexible expansion means thereby being connected in opposition and substantially balancing the effects of fluid pressure within said expansion joint.

5. The invention as set forth in claim 4 in which said flexible expansion means are bellows.

6. An expansion joint for interconnecting ends of a pair of conduits adapted to carry fluid under pressure, said joint comprising a pair of end members, an outer casing connected between said end members and larger in cross section at its mid-portion than either of said end members, a flexible expansion means forming the connection between said outer casing and one of said end members, a longitudinally expansible substantially streamlined inner casing substantially concentrically positioned within said outer casing and forming a closed chamber therein, a tubular member disposed through said inner casing and said outer casing and rigidly supporting a portion of said inner casing within said outer casing, said tubular member being perforated within said inner casing to thereby define a vent passage between said chamber and the atmosphere, said inner casing including a pair of streamlined end portions and a flexible expansion means forming a connection between said rigidly supported portion of said inner casing and one of said end portions, and flexible tension means disposed within said outer casing and connecting said one of said streamlined end portions of said inner casing to said one of said rigid end members which is connected to the first-mentioned flexible expansion means, said flexible expansion means thereby being connected in opposition and substantially balancing the effects of fluid pressure within said expansion joint.

7. An expansion joint for interconnecting ends of a pair of conduits adapted to carry fluid under pressure, said joint comprising a first end member and a second end member, an outer casing connected between said end members and larger in cross section at its mid-portion than either of said end members, a flexible expansion means forming the connection between said outer casing and said first end member, a longitudinally expansible substantially streamlined inner casing substantially concentrically positioned within said outer casing and forming a closed chamber therein, said inner casing including a first streamlined end portion and a second streamlined end portion and a flexible expansion means forming a connection therebetween, a hollow support member rigidly supporting said second streamlined end portion of said inner casing within said outer casing and defining a vent passage between said chamber and the atmosphere, and flexible tension means disposed within said outer casing and connecting said first streamlined end portion of said inner casing to said first end member, said flexible expansion means thereby being connected in opposition and substantially balancing the effects of fluid pressure within said expansion joint.

8. An expansion joint for interconnecting ends of a pair of conduits adapted to carry fluid under pressure, said joint comprising a pair of end members, an outer casing connected between said end members and larger in cross section at its midportion than either of said end members, a pair of flexible expansion means forming the connection between said outer casing and said pair of end members, a longitudinally expansible substantially streamlined inner casing substantially concentrically positioned within said outer casing and forming a closed chamber therein, a hollow support member rigidly supporting a central portion of said inner casing within said outer casing and defining a vent passage between said chamber and the atmosphere, said inner casing including a pair of streamlined end portions and a pair of flexible expansion means forming a connection between said pair of streamlined end portions of said inner casing and said central portion, and a pair of flexible tension means disposed within said outer casing and connecting said pair of streamlined end portions of said inner casing to said pair of end members, said flexible expansion means thereby being connected in opposition and substantially balancing the effects of fluid pressure within said expansion joint.

9. The invention as set forth in claim 8 in which said flexible expansion means are bellows.

10. An expansion joint for interconnecting ends of a pair of conduits adapted to carry fluid under pressure, said joint comprising a pair of end members, an outer casing connected between said end members and larger in cross section at its midportion than either of said end members, a pair of flexible expansion means forming the connection between said outer casing and said pair of end members, a longitudinally expansible substantially streamlined inner casing substantially concentrically positioned within said outer casing and forming a closed chamber therein, a tubular member disposed through said inner casing and said outer casing and rigidly supporting an intermediate portion of said inner casing within said outer casing, said tubular member being perforated within said inner casing to thereby define a vent passage between said chamber and the atmosphere, said inner casing including a pair of streamlined end portions and a pair of flexible expansion means forming a connection between said pair of streamlined end portions of said inner casing and said intermediate portion, and a pair of flexible tension means disposed within said outer casing and connecting said pair of streamlined end portions of said inner casing to said pair of end members, said flexible expansion means thereby being connected in opposition and substantially balancing the effects of fluid pressure within said expansion joint.

References Cited in the file of this patent

UNITED STATES PATENTS

| | | |
|---|---|---|
| 571,337 | Burnham | Nov. 17, 1896 |
| 2,348,833 | Miller | May 16, 1944 |
| 2,445,466 | Aynhym | July 20, 1948 |
| 2,718,896 | Jones | Sept. 27, 1955 |

FOREIGN PATENTS

| | | |
|---|---|---|
| 10,321 | Great Britain | July 23, 1887 |
| 396,685 | Great Britain | Nov. 6, 1931 |
| 534,704 | Germany | Sept. 10, 1931 |
| 725,839 | France | Feb. 16, 1932 |